US007836222B2

(12) United States Patent
Day et al.

(10) Patent No.: US 7,836,222 B2
(45) Date of Patent: Nov. 16, 2010

(54) SYSTEM AND METHOD FOR TRACKING MESSAGES BETWEEN A PROCESSING UNIT AND AN EXTERNAL DEVICE

(75) Inventors: Michael Norman Day, Round Rock, TX (US); Brian King Flachs, Georgetown, TX (US); Harm Peter Hofstee, Austin, TX (US); Charles Ray Johns, Austin, TX (US); John Samuel Liberty, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 2100 days.

(21) Appl. No.: 10/606,582

(22) Filed: Jun. 26, 2003

(65) Prior Publication Data

US 2004/0264445 A1 Dec. 30, 2004

(51) Int. Cl.
*G06F 3/00* (2006.01)
*G11C 8/00* (2006.01)
(52) U.S. Cl. .............................. 710/29; 710/57; 365/236
(58) Field of Classification Search .................... 710/34, 710/29, 52, 55, 57; 365/193, 221, 236; 370/359, 370/395.72
See application file for complete search history.

(56) References Cited

U.S. PATENT DOCUMENTS

| 6,408,354 | B1 * | 6/2002 | Young ......................... 710/313 |
| 6,738,881 | B1 * | 5/2004 | Ollivier et al. .............. 711/168 |
| 6,801,972 | B2 * | 10/2004 | Stuber et al. ................. 710/107 |
| 7,006,505 | B1 * | 2/2006 | Bleszynski et al. ..... 370/395.72 |
| 7,035,956 | B2 * | 4/2006 | Tanaka ........................ 710/306 |
| 2002/0032796 | A1 * | 3/2002 | Van Loo ..................... 709/235 |
| 2002/0078264 | A1 * | 6/2002 | Eberhard ....................... 710/1 |
| 2002/0174294 | A1 * | 11/2002 | Tamura ....................... 711/113 |
| 2003/0117176 | A1 * | 6/2003 | Tardieux et al. ............... 326/93 |

* cited by examiner

*Primary Examiner*—Niketa I Patel
*Assistant Examiner*—Ernest Unelus
(74) *Attorney, Agent, or Firm*—Matthew B. Talpis

(57) ABSTRACT

An apparatus which uses channel counters in combination with channel count read instructions as a means of providing information that data in a given channel is valid or has not been previously read. The counter may also, in the situation of the channel being defined as blocking, be used to prevent the unintentional overwriting of data in a register used by the channel or, alternatively, prevent further communications with the device assigned to that channel when a given count occurs. Intelligent external devices may also use channel count read instructions sent to the counting mechanism for reading from and writing to the channel.

16 Claims, 4 Drawing Sheets

SYSTEM AND METHOD FOR TRACKING MESSAGES BETWEEN A PROCESSING UNIT AND AN EXTERNAL DEVICE

TECHNICAL FIELD

The invention relates to a method of and apparatus for transmitting messages to and/or receiving messages from external devices by a PU (processing unit).

BACKGROUND

Normally, in the prior art, when a CPU or other PU (central or other processing unit) is waiting upon some event external to the program, the operating system or an active program will run a poll loop where it will keep reading an event register, utilized by the PU in connection with the program, until the event that it is waiting upon occurs. While the program is operating the PU in polling the event register, the PU is not doing useful work. Typical modern processors often use virtual memory and the memory mapping of external devices for this communication. On the other hand, some processors, especially in a multiprocessor environment, only have access to local memory and not to virtual memory. Local memory is finite and, in typical multiprocessor configurations, no memory outside of this local memory can be accessed by load and store operations. Thus, the use of local memory for other PU functions is limited while awaiting response from an external device. If a PU is simultaneously awaiting communication responses from several devices, the available memory for other functions is even further limited.

Memory may also be used to keep track of whether or not there is valid data in an incoming or outgoing register. Valid data is data that has been placed in the register for use by a receiving device but has not yet been accessed by the receiving device.

It would thus be desirable to provide a mechanism for communicating with one or more external devices without burdening the local or even the virtual memory of a PU.

It would further be desirable to keep track of valid data without burdening receiving device memory.

SUMMARY OF THE INVENTION

The present invention comprises using a PU control mechanism designated as a read or write channel register and associated channel message counting logic for maintaining communication with external devices.

BRIEF DESCRIPTION OF THE DRAWINGS

For a more complete understanding of the present invention, and its advantages, reference will now be made in the following Detailed Description to the accompanying drawings, in which.

DETAILED DESCRIPTION

In the remainder of this description, a processing unit (PU) may be a sole processor of computations in a device. In such a situation, the PU is typically referred to as a CPU (central processing unit). The processing unit may also be one of many processing units that share the computational load according to some methodology or algorithm developed for a given multiprocessor computational device. Where there are more than one processing units on a single chip, these PUs are sometimes referred to as SPUs (special or synergistic processing units). For the remainder of this discussion all references to processors shall use the term PU whether the PU is the sole computational element in the device or whether the PU is sharing the computational with other PUs.

Figure 1:
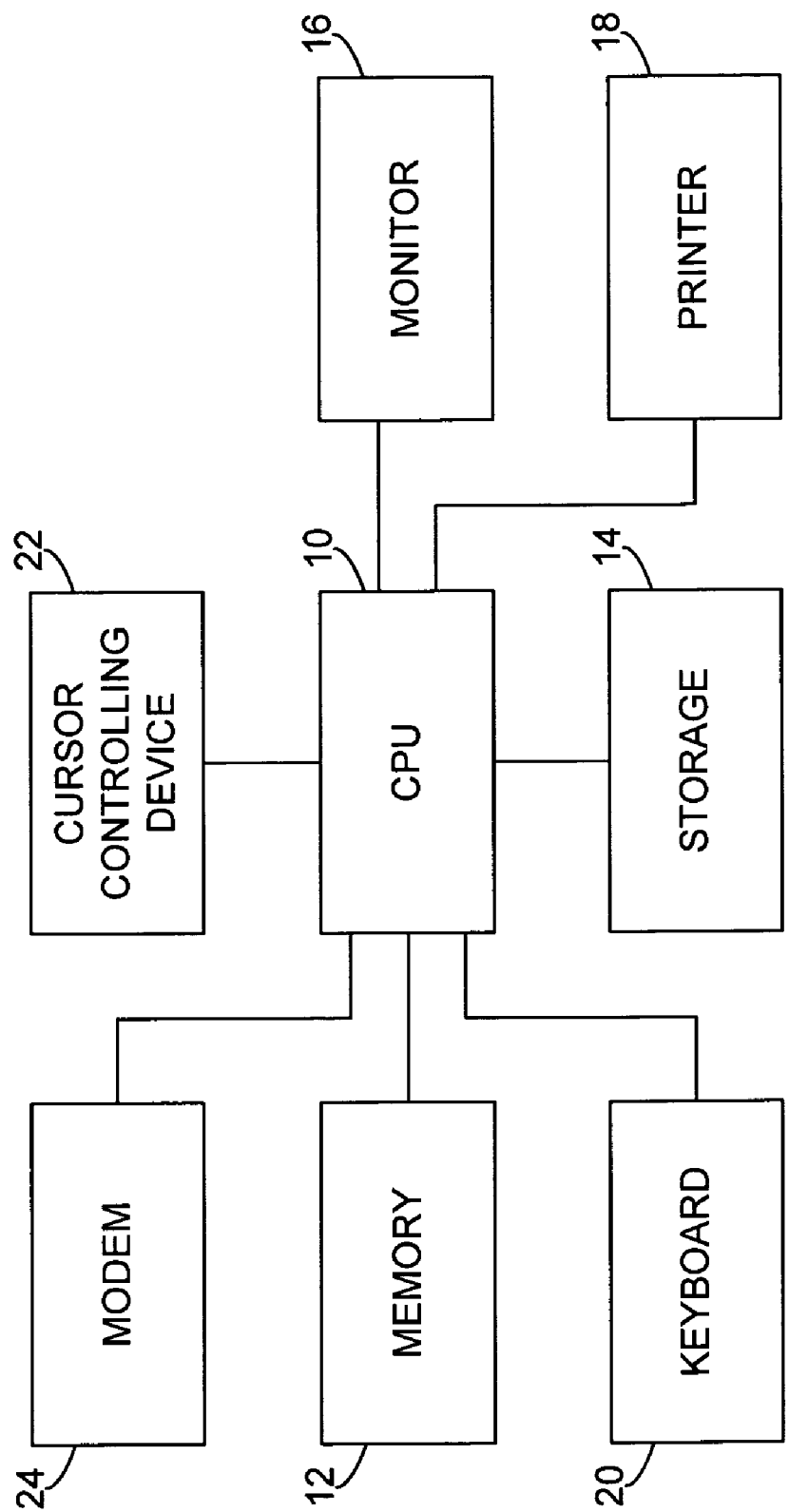
FIG. 1 is a generalized block diagram of a computer including external devices supplying inputs thereto and receiving communications therefrom.

In FIG. 1, a PU 10 is illustrated connected to a variety of components, such as memory 12, hard disk storage 14 and a monitor 16. In addition, there are shown various components, such as a printer 18, a keyboard 20, a cursor controlling device like a mouse or trackball 22, and a modem 24 that supply responses to the PU in accordance with events, such as a key being pressed on the keyboard 20, the printer 18 running out of paper or a button being pressed on the device 22. The memory 12 may include local cache memory as well as RAM (random access memory) and other memory, such as permanent storage memory and virtual memory. This memory 12 may further include a memory flow controller.

Figure 2:
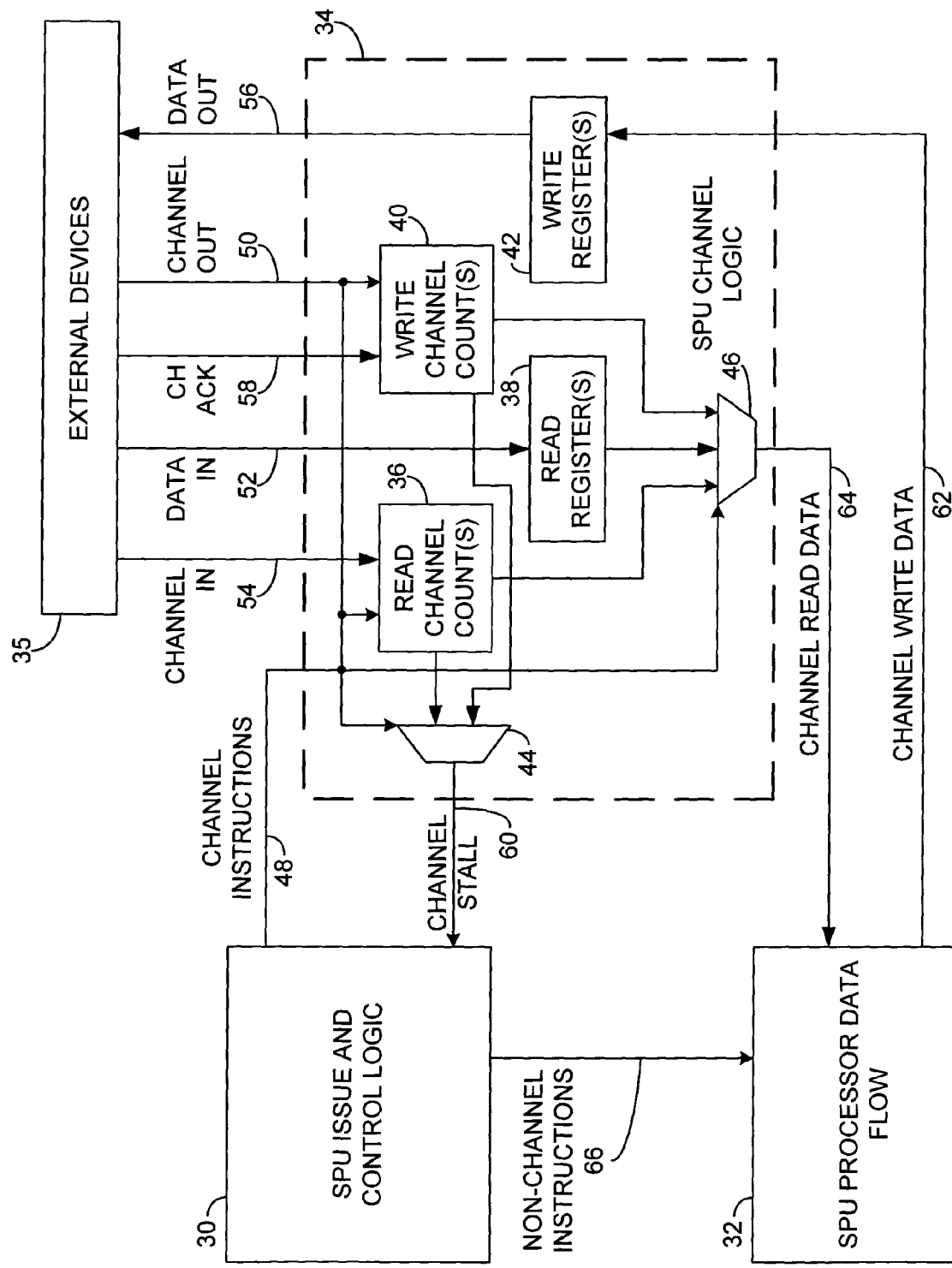
FIG. 2 shows the PU in more detail for the portions relevant the present invention.

In FIG. 2, a block 30 represents external device instruction issue and control logic of a processor. A block 32 represents data flow to and from a processor. As is known, a processor may simultaneously be in communication with many different external devices. In the present processor, the communication is accomplished via a channel register. Each channel operates in one direction only, and is called either a Read Channel or a Write Channel, according to the operation that can be performed on the channel by the PU. A block 34 represents the channel logic for one set of channels for a single external device as represented by a block 35. Within block 34 there is shown a read channel counter 36, a read register 38, a write channel counter 40, a write register 42, a MUX (multiplexer) 44 and a MUX 46. Channel instructions are delivered from the PU 30 on a bus 48 to the read and write counters 36 and 40 as well as to a gate input of the MUXs 44 and 46. These instructions are also supplied on a lead further designated as 50 to the appropriate external device such as 35. A data IN lead 52 provides data from the external device 35 to read register 38. A channel count IN signal is supplied from the external device 35 on a lead 54 to counter 36 signifying that data has been input to the register and operating to alter the count in counter 36 by one value or digit. The data being output to the external device from write register 42 is supplied on a lead designated as 56. A channel acknowledgement signal is returned from external device 35 on a lead 58 to write channel counter 40 when the external device has completed satisfactory reception of the data and operates to alter the count in counter 40 by one value unit or digit. In a preferred embodiment of the invention, a signal on bus 48 will decrement the appropriate read or write counter while a signal on either lead 54 or 58 will increment the appropriate read or write counter. As shown, the count of both of the counters 36 and 40 is supplied through the MUX 44 on a lead 60 to logic block 30. Channel write data is supplied from data flow block 32 on a lead 62 to the write register 42. Outputs from blocks 36, 38 and 40 are returned to data flow block 32 on a bus 64. Non channel instructions are communicated between blocks 30 and 32 via a bus 66.

Figure 3A:
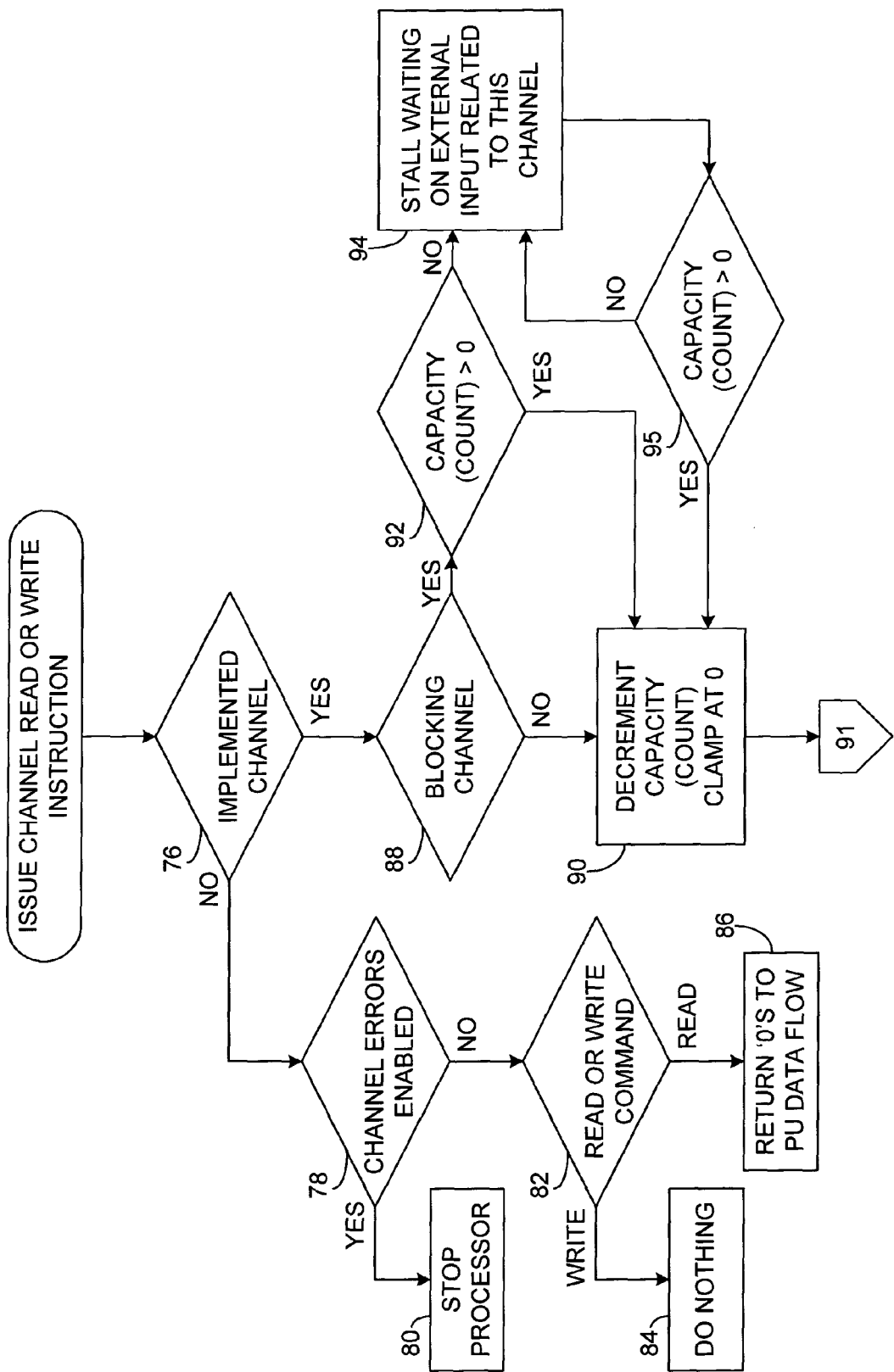
FIGS. 3A and 3B show a flow diagram of the process occurring with respect to reads and writes in FIG. 2.
Figure 3B:
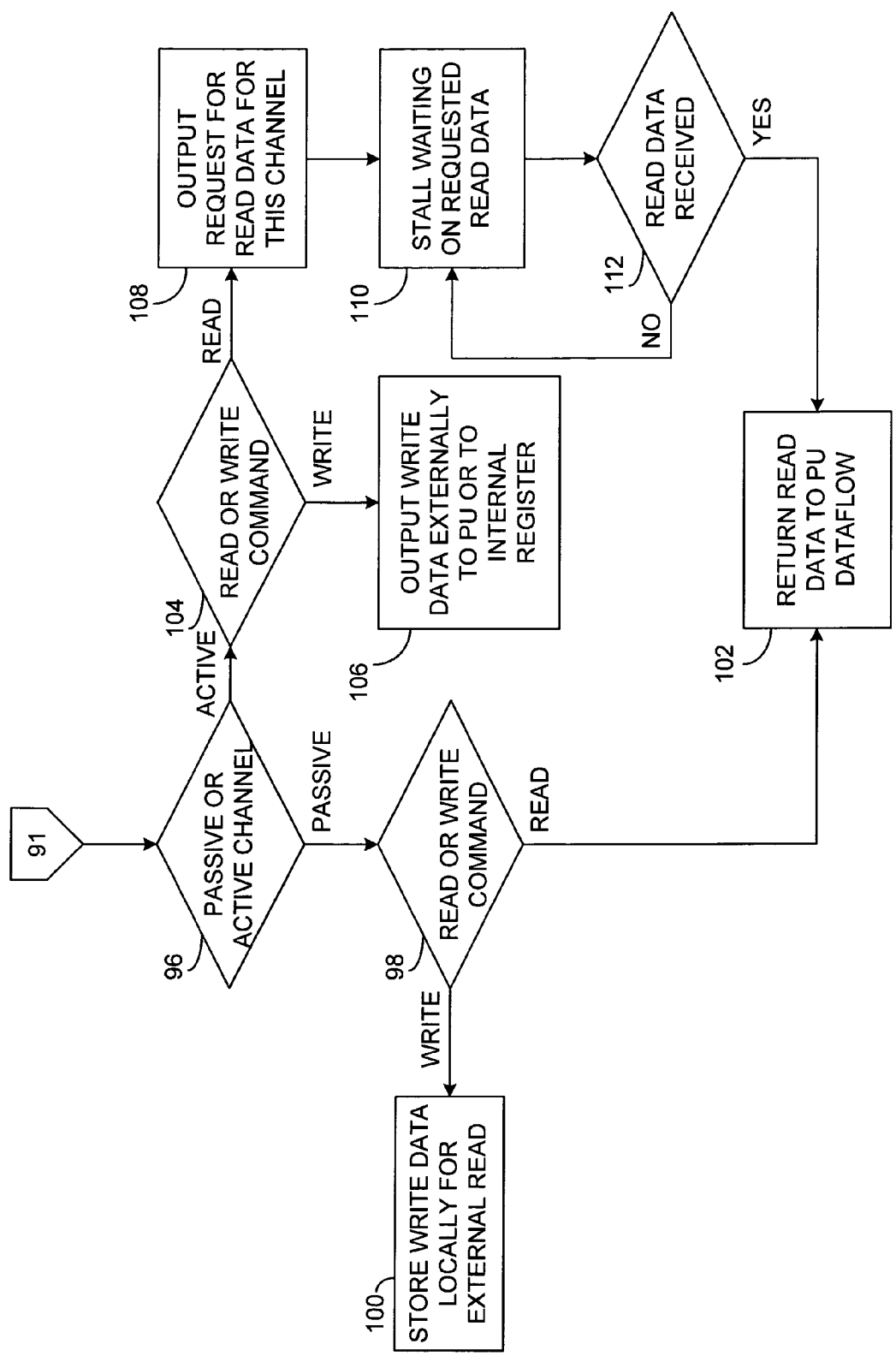

In the drawings of FIGS. 3A and 3B, the issuance of a channel read or write instruction will cause a determination in decision block 76 as to whether or not the channel specified is one where a control mechanism, as set forth above, has been implemented. If not, a determination is made in block 78 as to whether channel errors logic is enabled. If so, the processor is stopped as set forth in a block 80. If not, in a block 82, a determination is made as to whether the command is a read or a write. If it is a write, nothing further is done for that command as set forth in a block 84. On the other hand, if the non-implemented command is a read, zeros are returned to the data processor data flow as indicated in block 86. In either case, the process returns to a status of awaiting the next read or write instruction. In the preferred embodiment shown, all valid read instructions must return a value. As defined herein, channel read instructions to a non-implemented channel return a value of all zeroes.

It may be noted that for a particular implementation, not all channels have to be defined. Each channel will have a unique numerical identifier. In a preferred embodiment, this channel identifier ranged from 0 to 127. However, since not all channels need to be defined, not all identifiers are used. Thus, if there is an instruction to an undefined channel, then the process goes down the above-referenced non-implemented path. It may be desired, in some implementations, that channel read or write commands to non-implemented channels be considered an illegal operation. The further action may possibly be to force the processor to stop, as shown in the previously mentioned block 80.

If, in block 76, it is determined that the channel specified has been implemented, a check is made, in block 88, to see if the specified channel is a blocking channel. If not, the process continues to block 90 where the count for that channel is decremented but not allowed to be less than zero. If the channel is determined to be blocking, a check is made in a block 92 if the count for that channel is greater than zero. If so, the process returns to block 90. If the count is already at zero, as determined in block 92, further external inputs related to this channel are stalled until the PU has a chance to read data from the register and thus change the count from zero. Thus the loop of blocks 94 and 95 is periodically processed until there is a change in the count for this channel. Once the count is changed, the process continues from block 95 to block 90. The next step, from block 90, is to block 96, where it is determined if the channel is active or passive. If passive, a decision block 98 checks to see if the command is a write or read instruction. If it is a write instruction, the data is stored locally for external read as shown in a block 100. If it is a read instruction, the process continues to a block 102 where the data is returned to the PU block 32 of FIG. 2.

It may be noted that, in the situation of a passive channel, the PU is dependent upon an external process to complete the operation. As an example, a read channel may be dependant on an external device to load data. On the other hand, in an active channel, the PU actively completes the operation of executing a read or write operation. An example of this type of operation is when the connected hardware makes an external request for data from an active read channel.

When it is determined, in block 96, that the channel is an active channel, a decision block 104 checks to see if the command is a read or write command. If the command is to write, the write data is completed as shown in a block 106. If the command is read, a read request is sent to the appropriate external device as set forth in a block 108. Input of the requested data is awaited as stated in block 110. Periodically, a determination is made, as shown in a block 112, as to whether or not the read data has been received. If not, the action returns to block 110 until the time for the next check occurs. When the data is received, the process is completed in previously mentioned block 102.

From the above, it will be apparent that each channel is accessed using a specific channel read or write instruction where the channel number is specified in the instruction. Each channel has a count specified with it. This count is read using a read channel count instruction where the channel of interest is specified in the instruction. Channel commands are not speculative and cannot be processed out of order at the external interface. The channel architecture does not require that devices external to the PU process the channel commands in order, but may do so depending on the processor and external device implementation. The value in this count register keeps track of the number of accesses to this register versus the number of external acknowledgments that have occurred to this register.

In operation, the manner of changing of the channel count via accesses through the external interface(s) is based on implementation. In the preferred embodiment, the count is incremented by one for each successful data transfer to or from a register. For each channel, PU access can be defined as a read or write channel. Further, in the preferred embodiment, a ZERO count is used to stall further operations when the channel is defined or implemented as a "blocking" channel. When a channel register is defined to have a queue depth of ONE, a ZERO count may be used to indicate that the data in that channel is not valid. The channel can also be defined to stall PU operations on a read or write channel command, on that command, if the count is zero until such time as the count is no longer zero.

In the preferred embodiment, the counter value is decremented for every PU initiated read or write channel command and is incremented for each external initiated read or write (with or without data) access. In other words, the counter maintains an indication of inputs versus outputs. Thus, a value or count of zero indicates that, for writes, no more external write slots are available. On the other hand, a count value of zero for reads indicates that there is no valid data. When the count is zero, if an additional PU read or write channel command is issued, and the channel is defined as non-blocking, then the count will remain at zero and data in the register is lost. As implemented in the preferred embodiment, the previously most recent data in that register is lost. If the count is at maximum value for the number of bits of that channel register implementation and there occurs an additional transaction that would cause the count to increment out of range, then the count will stay at that maximum value.

The method of initializing the count value is implementation dependant, and one method is initialization through the external interface. This count can be used for flow control for a write queue. The count can be preset to the depth of the external queue. A value of zero in the count register means that there is no more space in this external queue. For an external queue depth of one, the count should be preset to one. When the PU writes to this channel, the count goes to zero. When the external device reads from this channel, the count is incremented to one, thereby indicating that the channel is ready for another write operation. As mentioned above, for reads of the channel registers, this allows the count to indicate valid data. If the count register is preset to zero, this indicates that the data is not valid. When the external device writes to this channel, the count increments to one, indicating the data is valid for SPU reads. When the PU reads from this channel, the count decrements back to zero, indicating that another external write can occur.

In a preferred embodiment of the invention, computer code channel count read instructions are sent to the counter to ascertain the count for both the read and write channels. When the external device is an intelligent device, such as another computer in a multiprocessor environment, the external device may also send channel count read instructions to the counter to ascertain the count. In this manner, the external device may determine when the channel contains unread data in either the read or write channel and/or when it is appropriate to send additional data to the processor containing the read channel.

In usage with this invention, the read and write channels may be either non-accumulating or accumulating. Accumulating channels are channels that accumulate multiple writes, that is, incoming data is logically added to data already contained in a register or other storage means, until the channel is read. Upon reading the channel, the accumulating register is reset, typically to zero, and the channel begins accumulating again. This action can be for both read or write channels. Further, accumulating channels can be blocking or non-blocking. Typically, accumulating channels will only have a count depth of '1' as opposed to non-accumulating channels may act to count each write to that channel.

In summary, the present invention utilizes defined channels to free up memory but still provide easily accessible information as to when data in a register is valid or, in other words, has not been previously read. This information is obtained by sending a channel count read instruction to the counting mechanism. When an intelligent external device is connected to a given channel, a similar instruction may be used by the external device in sending or receiving data to or from given channels. The present invention, through the use of the channel count read instructions, also further prevents the accidental overwriting of data in a register when the specified channel is defined as a blocking channel.

Although the invention has been described with reference to a specific embodiment, the description is not meant to be construed in a limiting sense. Various modifications of the disclosed embodiment, as well as alternative embodiments of the invention, will become apparent to persons skilled in the art upon reference to the description of the invention. It is therefore contemplated that the claims will cover any such modifications or embodiments that fall within the true scope and spirit of the invention.

What is claimed is:

1. A method for tracking communications between a processing unit (PU) and an external device (ED), comprising:
   receiving, by the PU, data from the ED, into a read register;
   sending, by the PU, data to the ED, from a write register;
   incrementing a read channel count upon receipt of inbound data from the ED by the PU;
   issuing a read channel instruction to decrement the read channel count upon processing of received inbound data by the PU;
   incrementing a write channel count upon receipt of outbound data from the PU by the ED;
   issuing a write channel instruction to decrement the write channel count upon transmission by the PU of the outbound data to the ED;
   accessing the read channel count; and
   comparing the accessed read channel count with a predetermined range to determine whether the PU has received data from the ED.

2. The method as recited in claim 1, further comprising associating an active channel with the read register and the write register.

3. The method as recited in claim 2, wherein issuing a write channel instruction further comprises writing data externally to the PU.

4. The method as recited in claim 2, wherein issuing a write channel instruction further comprises writing data to an internal register of the PU.

5. The method as recited in claim 2, wherein issuing a read channel instruction further comprises returning read data to a PU dataflow.

6. The method as recited in claim 1, further comprising associating a passive channel with the read register and the write register.

7. The method as recited in claim 6, wherein issuing a write channel instruction further comprises storing write data locally for an external read operation.

8. The method as recited in claim 6, wherein issuing a read channel instruction further comprises returning read data to a PU dataflow.

9. A computer program product for tracking communications between a processing unit (PU) and an external device (ED), the computer program product having a computer-readable medium with a computer program embodied thereon, the computer program comprising:
   computer code for receiving, by the PU, data from the ED, into a read register;
   computer code for sending, by the PU, data to the ED, from a write register;
   computer code for incrementing a read channel count upon receipt of inbound data from the ED by the PU;
   computer code for issuing a read channel instruction to decrement the read channel count upon processing of received inbound data by the PU;
   computer code for incrementing a write channel count upon receipt of outbound data from the PU by the ED;
   computer code for issuing a write channel instruction to decrement the write channel count upon transmission by the PU of the outbound data to the ED; and
   computer code for accessing the read channel count; and
   computer code for comparing the accessed read channel count with a predetermined range to determine whether the PU has received data from the ED.

10. The computer program product as recited in claim 9, further comprising computer code for associating an active channel with the read register and the write register.

11. The computer program product as recited in claim 10, wherein issuing a write channel instruction further comprises writing data externally to the PU.

12. The computer program product as recited in claim 10, wherein issuing a write channel instruction further comprises writing data to an internal register of the PU.

13. The computer program product as recited in claim 10, wherein issuing a read channel instruction further comprises returning read data to a PU dataflow.

14. The computer program product as recited in claim 9, further comprising computer code for associating a passive channel with the read register and the write register.

15. The computer program product as recited in claim 14, wherein issuing a write channel instruction further comprises storing write data locally for an external read operation.

16. The method as recited in claim 14, wherein issuing a read channel instruction further comprises returning read data to a PU dataflow.

* * * * *